US006523860B1

(12) United States Patent
Shkolnikov et al.

(10) Patent No.: US 6,523,860 B1
(45) Date of Patent: Feb. 25, 2003

(54) FUEL CELL ADAPTER SYSTEM FOR COMBUSTION TOOLS

(75) Inventors: Yury Shkolnikov, Glenview, IL (US); Tony Deieso, Wadsworth, IL (US); Walter J. Taylor, McHenry, IL (US); Sandra J. Wilson, Hawthorn Woods, IL (US)

(73) Assignee: Illinois Tool Works Inc., Glenview, IL (US)

(*) Notice: Subject to any disclaimer, the term of this patent is extended or adjusted under 35 U.S.C. 154(b) by 87 days.

(21) Appl. No.: 09/689,546

(22) Filed: Oct. 12, 2000

(51) Int. Cl.[7] ............................ F16L 39/00; B25C 1/06
(52) U.S. Cl. ......................... 285/3; 285/148.23; 227/10
(58) Field of Search ........................... 285/3, 4, 148.18, 285/148.23, 140.1, 328; 206/807; 123/466; 227/10, 130; 141/349

(56) References Cited

U.S. PATENT DOCUMENTS 1,221,650 A 4/1917 Atkins et al.
3,654,965 A * 4/1972 Gramain ...................... 138/89
3,858,910 A 1/1975 Oetiker
3,907,012 A 9/1975 Burke
3,978,844 A 9/1976 Wilkens
4,065,029 A 12/1977 Chernock
4,094,384 A 6/1978 Heilmann
4,483,473 A 11/1984 Wagdy
4,491,060 A 1/1985 Boski
4,878,595 A * 11/1989 Uhlig ......................... 206/807
4,902,043 A * 2/1990 Zillig et al. .................... 138/89
4,905,576 A 3/1990 Reynolds
4,911,194 A * 3/1990 Lechner ................. 137/614.04
4,971,224 A 11/1990 Scremin
4,995,643 A * 2/1991 Rappart et al. ............... 285/30
5,029,730 A 7/1991 Kostecki et al.
5,070,858 A 12/1991 Wang
5,263,439 A 11/1993 Doherty et al.
5,567,074 A * 10/1996 Dovak et al. .................. 285/3
5,680,980 A 10/1997 Robinson
5,911,443 A * 6/1999 Le Quere .................... 285/23
5,954,345 A * 9/1999 Svoboda et al. .............. 16/2.3
5,979,867 A * 11/1999 Ortiz Godinez ............. 137/75
5,988,039 A 11/1999 Denchfield et al.
6,016,945 A 1/2000 Phillips et al.
6,032,833 A 3/2000 Olegnowicz
6,032,835 A 3/2000 Burt
6,032,836 A 3/2000 Hiscocks et al.
6,053,005 A * 4/2000 Boitnott ...................... 137/384
6,217,085 B1 4/2001 Toulouse
6,371,338 B1 4/2001 Klein et al.
6,302,297 B1 * 10/2001 Richardson et al. ........... 222/1

FOREIGN PATENT DOCUMENTS

EP 1 197 299 4/2002
FR 826699 6/1938

* cited by examiner

*Primary Examiner*—Eric K. Nicholson
(74) *Attorney, Agent, or Firm*—Lisa M. Soltis; Mark W. Croll; Donald J. Breh

(57) ABSTRACT

A fuel cell adapter system for a combustion tool which includes a housing enclosing a fuel metering valve. The fuel cell is provided with an adapter having a generally cylindrical nozzle and a base configured for engagement upon the fuel cell. The nozzle has a free end and defines a passageway. A frangible membrane is provided for blocking the passageway. The adapter also has a gripping formation that is configured for engagement with a latch, so that the adapter is accommodated in the housing in fluid communication with the fuel metering valve. The latch is disposed in the housing for releasably securing the adapter in fluid communication with the fuel metering valve. The latch includes a latch body having at least one locking tang movable between a closed position and an open position, and a release member for moving the locking tang to release said engagement with the adapter and permitting withdrawal of said fuel cell from said tool.

14 Claims, 5 Drawing Sheets

FUEL CELL ADAPTER SYSTEM FOR COMBUSTION TOOLS

BACKGROUND OF THE INVENTION

This invention relates to improvements in fuel cell adapter systems for use in combustion tools.

As exemplified in Nikolich U.S. Pat. Nos. 4,403,722, 4,483,474, 4,522,162, and 5,115,944, all of which are incorporated by reference, it is known to use a dispenser for a dispensable fluid to dispense a hydrocarbon fuel to a combustion gas-powered tool, such as, for example, a combustion gas-powered fastener-driving tool. Such fastener-driving tools and such fuel cells are available commercially from ITW-Paslode (a division of Illinois Tool Works, Inc.) of Vernon Hills, Ill., under its IMPULSE trademark. In particular, a suitable fuel cell is described in Nikolich U.S. Pat. No. 5,115,944, listed above.

A standard system for attaching a fuel cell to a combustion tool is known, i.e. placing the fuel cell into the combustion tool with a metering unit, and having no adapter. This system has the advantage of being compact, however it does not protect the female metering unit inlet from dirt and other debris. Also, when not using an adapter, a protective cap or blister pack is needed for transporting the fuel cell.

There is another known fuel cell attachment system for combustion tools, where a seal support attaches to a fuel cell and creates a seal for joining the fuel cell stem and a male joiner from the combustion tool. However, this adapter system does not protect the fuel cell from dirt and other debris. Another disadvantage is that the presence of this adapter alone is believed to diminish the life and capacity of the fuel cell. Still another unwanted characteristic of this adapter is that it can be removed from its current fuel cell and reused with a generic fuel cell.

Accordingly, one object of the present invention is to provide an improved fuel cell attachment system that protects the fuel cell from dirt and other debris while in use.

Another object is to provide an improved fuel cell adapter that protects the fuel cell stem during transportation, thus eliminating the need for a protective cap or blister pack.

A further object is to provide an improved fuel cell adapter that is able to provide visual identification of whether the fuel cell is unused or not.

Yet another object of the present invention is to provide an improved combustion tool featuring a latch inside the combustion tool that releasably holds the fuel cell in an engaged position.

Still another object is to provide an improved adapter for a fuel cell that cannot be removed from a fuel cell and reused with a generic fuel cell.

BRIEF SUMMARY OF THE INVENTION

The above-listed objects are met or exceeded by the present fuel cell adapter system for a combustion tool which features an adapter having a frangible membrane on its free end to protect the fuel cell during transportation, a gripping formation configured for engagement with a latch, and a latching feature inside the combustion tool which releasably secures the fuel cell in engagement with the internal tool fuel metering valve. In addition, the present latching feature keeps the whole system compact in size and facilitates installation and removal of the fuel cell.

In addition to protecting the fuel cell during transportation, the present adapter system also protects the fuel cell from dirt and debris while in use with the combustion tool. Further, the frangible membrane on the adapter visually indicates whether the fuel cell is unused. Another advantage of the present invention is that the user cannot remove and reuse the adapter on another fuel cell.

More specifically, the present invention provides a fuel cell adapter configured for connection to a fuel cell, including an adapter body having a generally cylindrical nozzle and a base configured for engagement upon the fuel cell, with the nozzle being connected to the base. The nozzle defines a passageway, and is provided with a frangible membrane blocking the passageway.

Another embodiment of the present invention is a fuel cell adapter configured for connection to a fuel cell, including an adapter body having a generally cylindrical nozzle and a base configured for engagement upon the fuel cell, with the nozzle being connected to the base. The adapter body also has a gripping formation configured for engagement with a latch.

The nozzle has a plurality of lugs and a plurality of support ribs. Each lug has a ramped configuration, extending from the free end toward the base, and has a truncated lug end. The support ribs each have a truncated rib end and are configured for connecting the nozzle to the base.

A molded insert seal is housed in the passageway of the adapter body, and defines an axial passageway with a first end configured for receiving a stem and a second end provided with a pair of internal sealing rings located in the axial passageway.

The present invention further provides a combustion tool including a housing which encloses a fuel metering valve and a fuel cell provided with an adapter configured for being accommodated in the housing for fluid communication with the metering valve. A latch is disposed in the housing for releasably securing the adapter in fluid communication with the metering valve. The latch includes a latch body having at least one locking tang movable between a closed position and an open position. There is also a release member for moving the locking tang to release the engagement with the adapter and permitting withdrawal of the fuel cell from the tool.

DETAILED DESCRIPTION OF THE INVENTION

Figure 1:
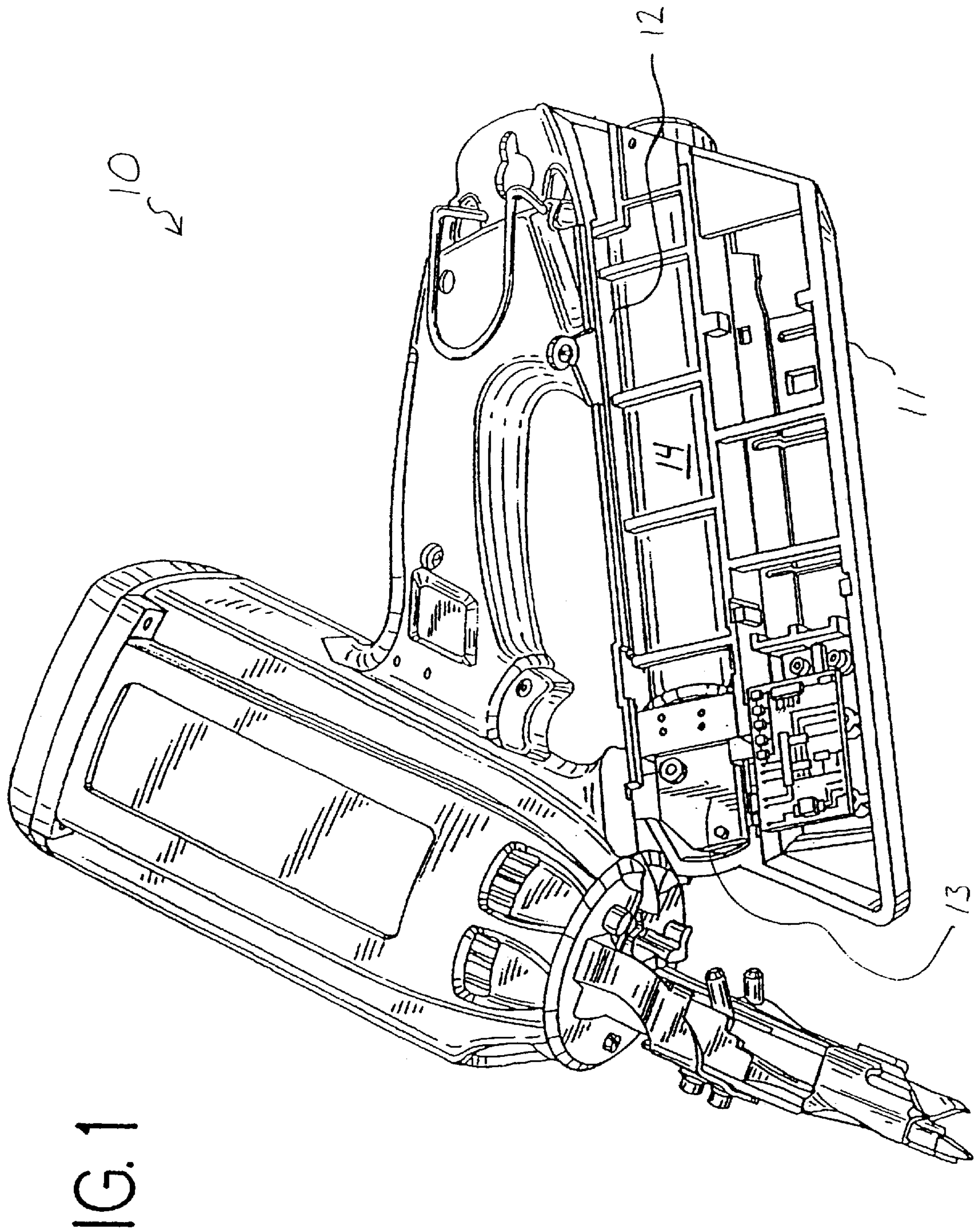
FIG. 1 is a perspective view of a combustion tool incorporating the present invention.

Referring now to FIG. 1, a combustion-powered tool of the type suitable for use with the present invention is generally designated 10. The tool 10 includes a housing 11 enclosing a fuel metering valve 13, and a fuel cell chamber 12 which releasably houses a fuel cell 14. The construction and operation of the tool 10 is described in detail in the patents incorporated by reference and referred to above.

Figure 2:
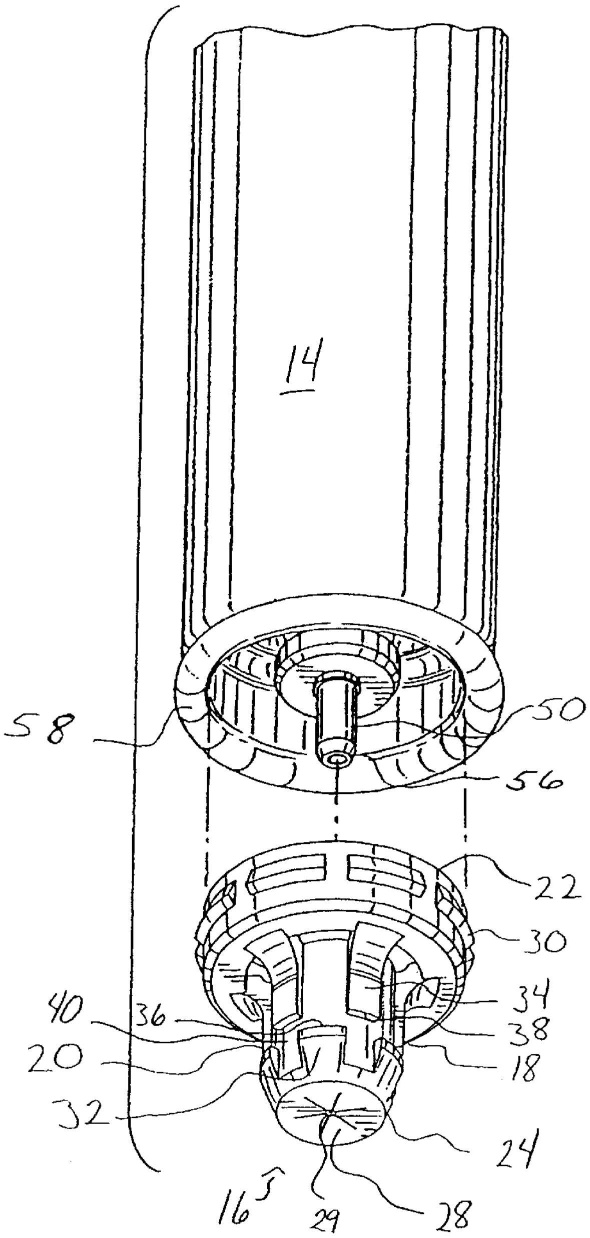
FIG. 2 is a fragmentary exploded perspective view of the present adapter and the fuel cell.
Figure 3:
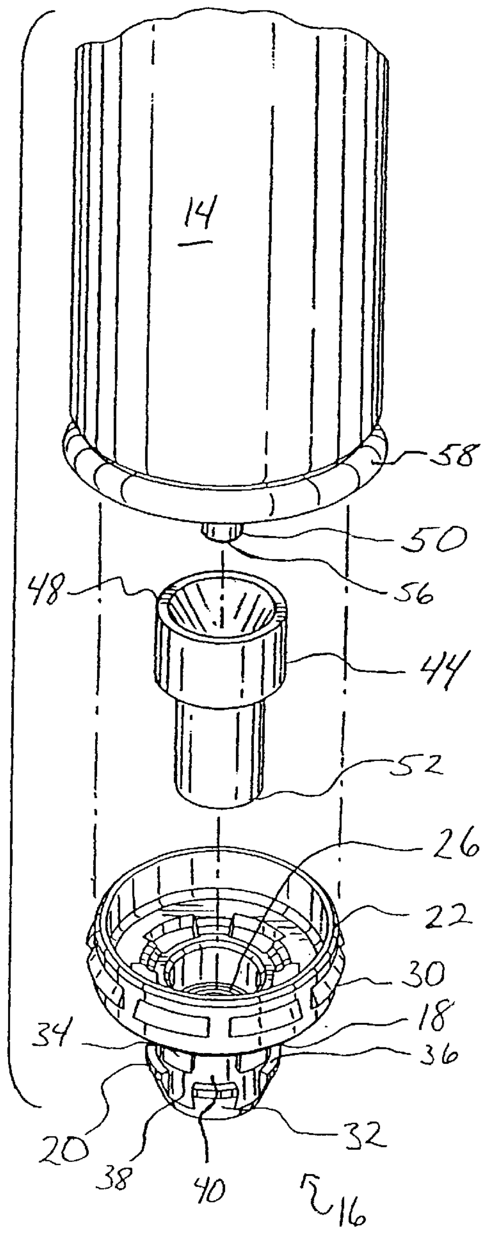
FIG. 3 is a fragmentary exploded perspective view of the present adapter, the molded insert seal and the fuel cell.

In FIGS. 2 and 3, a fuel cell adapter, generally designated 16, is configured for connection to the fuel cell 14, and facilitates engagement of the fuel cell in the fuel cell chamber 12. An adapter body 18 has a generally cylindrical nozzle 20 and a base 22 configured for engagement upon the fuel cell 14, and the nozzle is connected to the base. The nozzle 20 has a free end 24 and defines a passageway 26, with a frangible membrane 28 blocking the passageway 26. This frangible membrane 28 has a hole 29 that allows for air escape, and it is preferably disposed at or adjacent the free end 24 of the nozzle 22 for visually indicating tampering when ruptured. However, other locations along the passageway 26 are contemplated for the membrane 28. In a preferred embodiment, the diameter of the hole 29 measures about 0.010 inches, however the size of the diameter may vary depending on the application.

On the adapter body 18, the nozzle 20 has a plurality of lugs 32 and a plurality of support ribs 34. The lugs 32 each have a ramped configuration, extending in an inclined configuration from the free end 24 toward the base 22, and each have a truncated lug end 36. The generally L-shaped support ribs 34 each have a truncated rib end 38, and are configured for connecting the nozzle 20 to the base 22. A feature of the present adapter 16 is that the spaced support ribs 34 are the fastening point of the nozzle 20 to the base 22 and thus provide a "break away" action if a user attempts to remove the adapter from the fuel cell 14. Thus the reuse of adapters 16 is prevented.

In the preferred embodiment, the adapter 16 is provided with a gripping formation 40 which is configured for being engaged by a latch disposed in the fuel cell chamber 12 of the housing 11. This gripping formation 40 may have a variety of shapes. In the embodiment depicted in FIGS. 2–4, corresponding truncated lug ends 36 and the rib ends 38 of the lugs 32 and the support ribs 34 define a groove 40 that is disposed on the nozzle 20. Although it is preferred that the adapter body 18 have a gripping formation 40 in the form of a groove as just described, it is also contemplated that the gripping formation is alternatively a rib or protrusion, generally radially extending from the adapter body 18. Such protrusions may form an annular rib or may also be individual, spaced, lugs or rib segments.

Also in a preferred embodiment, the lugs 32 are radially spaced relative to each other, and the support ribs 34 are radially spaced relative to each other. The lugs 32 are also axially skewed, in other words, are not axially aligned relative to the opposing corresponding support ribs 34. Thus, as depicted in FIGS. 2 and 3, a staggered relationship is defined between the lugs 32 and the support ribs 34.

There is at least one barb 30 formed on the base 22 configured for frictionally engaging the fuel cell 14. In a preferred embodiment, there are a plurality of barbs 30 disposed in a radially extending fashion around the exterior of the base 22.

Figure 7:
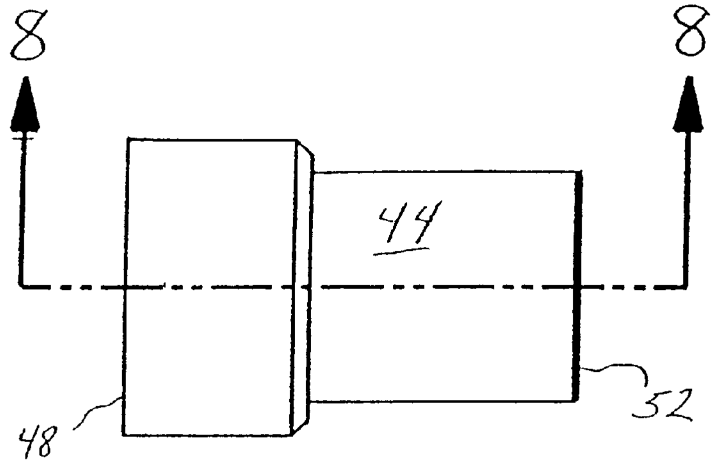
FIG. 7 is an elevational view of the molded insert.
Figure 8:
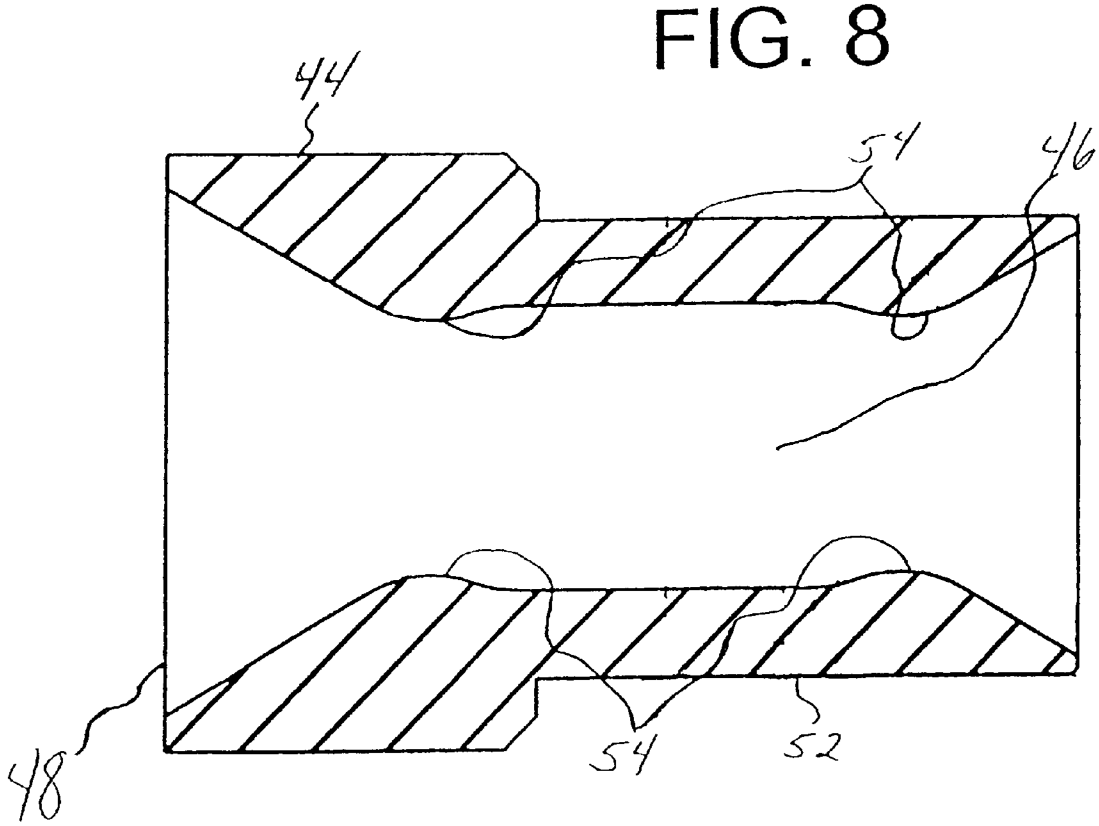
FIG. 8 is a sectional view taken along the line 8—8 of FIG. 7 and in the direction generally indicated.

As shown in FIGS. 3, 7 and 8, the adapter body 18 houses a molded insert seal 44 which fits in the passageway 26. The molded insert seal 44 defines an axial passageway 46 (best seen in FIG. 8), and has a first end 48 configured for receiving a fuel cell stem 50, and a second end 52 provided with a pair of internal sealing rings 54 which are located in the axial passageway. It will be seen that, in the preferred embodiment, the first end 48 has a larger diameter than the second end 52.

Figure 4:
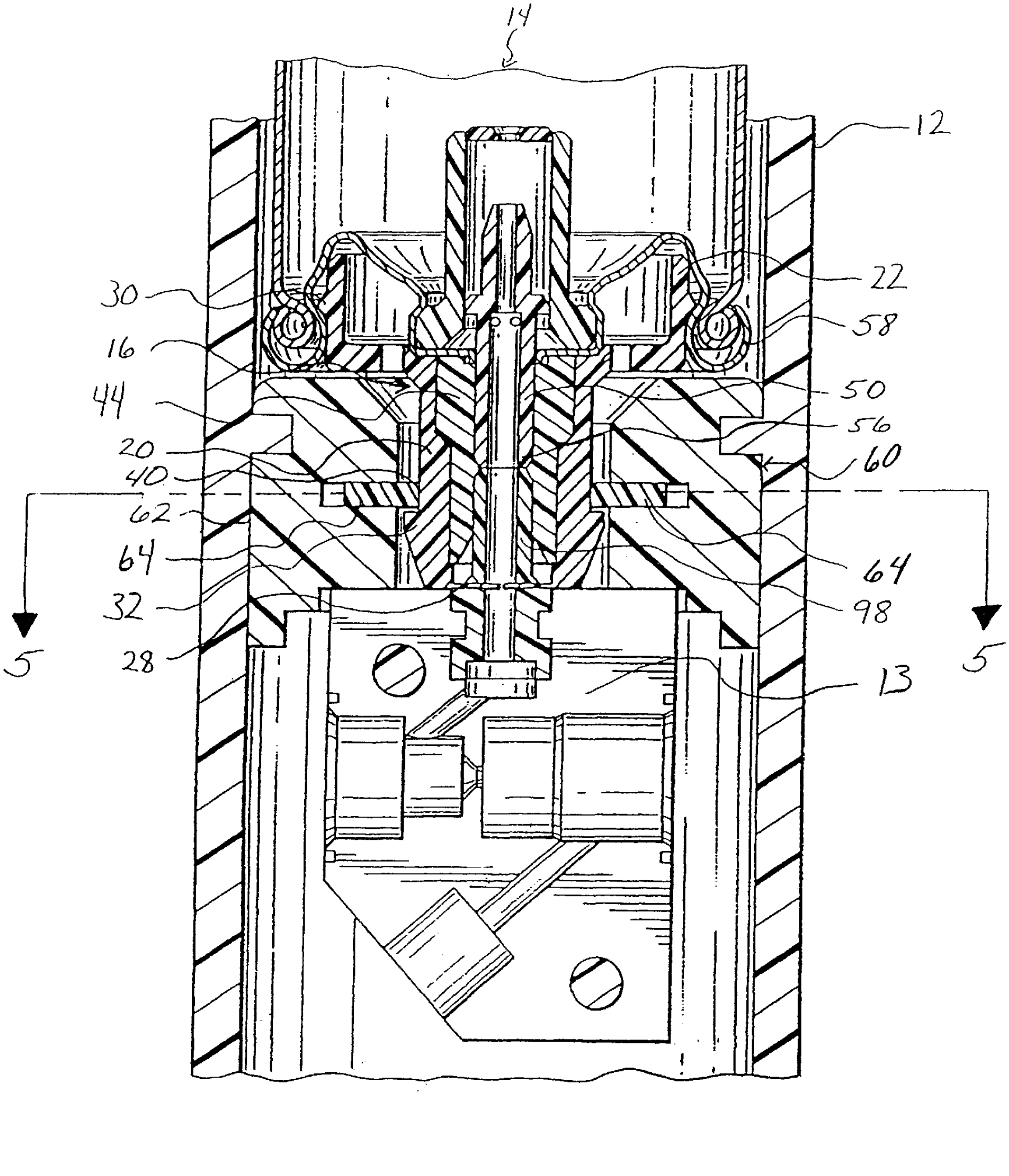
FIG. 4 is a fragmentary vertical sectional view of the present fuel cell adapter system depicting the adapter and molded insert seal engaged with the fuel cell, and the latch holding the adapter and fuel cell in the combustion tool.

To place the adapter 16 onto the fuel cell 14, the molded insert 44 is fitted into the adapter body 18 where it is accommodated in the passageway 26. Then the adapter 16 is placed onto the fuel cell stem 50 so that a tip 56 of the fuel cell stem (FIGS. 2, 3 and 4) slides into the molded insert 44 and lies in between the pair of internal sealing rings 54. In order to securely attach the adapter 16 onto the fuel cell 14, the base 22 is pushed downward onto a rolled seam 58 (FIGS. 2 and 3) of the fuel cell, so that the barbs 30 on the base hook under and frictionally engage the rolled seam. As seen in FIG. 4, the adapter 16 is securely fit onto the fuel cell 14 with the barbs 30 under the rolled seam 58.

With the adapter 16 in place on the fuel cell 14 and before the system is placed in a combustion tool 10, the frangible membrane 28 will still be intact (un-pierced) which gives the adapter the advantage of protecting the fuel cell during transportation. Because of this advantage, there is no need for a protective fuel cell cap. Another advantage is that the intact frangible membrane 28 gives visual identification that the fuel cell 14 is unused.

Referring now to FIGS. 1, 4, 5 and 6, the fuel cell 14 is provided with the adapter 16 and it is configured for being accommodated in the housing 11 to be in fluid communication with the fuel metering valve 13. The fuel metering valve 13 that is shown is only one of several embodiments that are known in the art. A feature of the present system is a latch 60, which can be seen in FIGS. 4, 5 and 6 that is disposed in the housing 11 for releasably securing the adapter 16 in fluid communication with the fuel metering valve 13.

Figure 5:
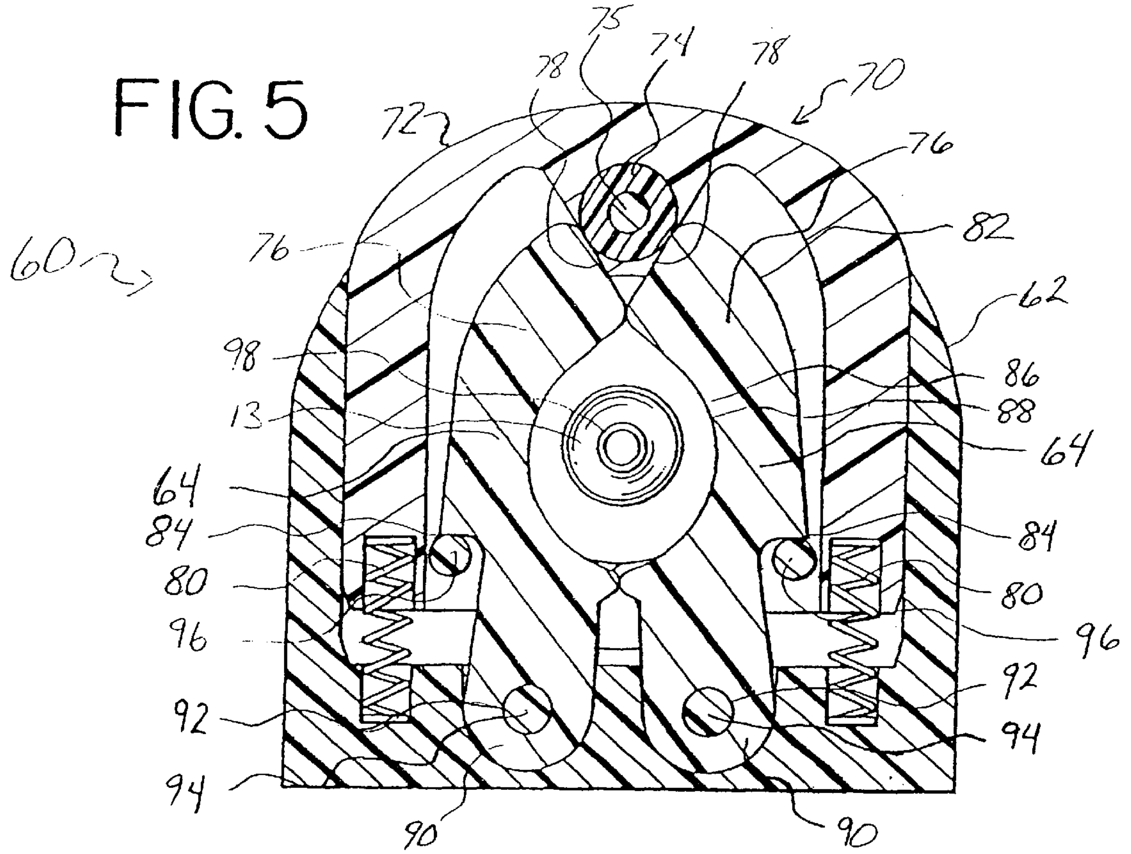
FIG. 5 is a sectional view taken along the line 5—5 in FIG. 4 in the direction generally indicated, showing the latch in the closed position.
Figure 6:
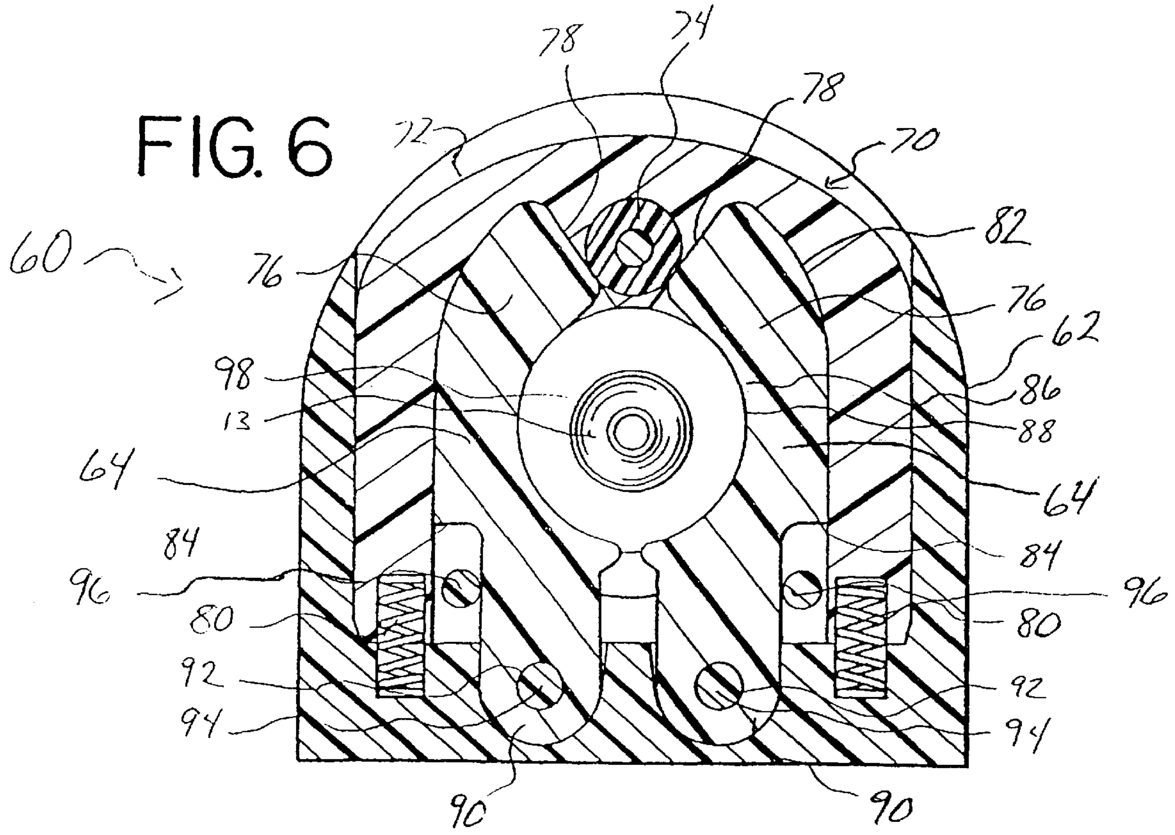
FIG. 6 is a sectional view taken along the line 5—5 in FIG. 4 in the direction generally indicated, showing the latch in the open position.

The latch 60 includes a latch body 62 having at least one and preferably two locking tangs 64 which are movable between a closed position (FIG. 5) and an open position (FIG. 6). In the closed position, the tangs 64 secure the adapter 16 in the housing 11. Also included is a release member 70 for moving the locking tangs 64 to release the engagement with the adapter 16 and to permit withdrawal of the fuel cell 14 from the tool 10. In the preferred embodiment of the latch 60 shown in FIGS. 5 and 6, the locking tangs 64 are biased to a closed position, although it is also contemplated that the locking tangs could be arranged to be biased in the open position. It is also preferred that the two locking tangs 64 in the latch 60 are disposed to be in an opposing relationship to each other.

Still referring to FIGS. 5 and 6, the preferred embodiment of the latch 60 is to have a push button 72 as the release member 70, with the push button having a generally circular raised boss 74 for engaging the locking tangs 64. The boss 74 is secured to the push button 72 by a friction fit with a lug 75, adhesive, or other fasteners that are well known in the art. Also in the preferred latch 60, each locking tang 64 has a contact end 76 with an inclined surface 78 for being progressively separated as the boss 74 is moved axially against a biasing force pressing the tangs to the closed position. In the preferred embodiment, the biasing force is provided by a pair of compression springs 80 located in a chamber 81 spanning the latch body 62 and the push button 72 to bias the button to an outward position. It is contemplated that the number, arrangement and strength of the springs may vary to suit the application.

In the latch 60, each locking tang 64 has an outside edge 82 defining a shoulder 84. There is also an inside edge 86 forming a surface 88 for engaging the groove 40 of the adapter 16. In the preferred embodiment, the surface 88 is arcuate in shape to better grasp the generally circular nozzle 20. However, it is contemplated that the shape of the surface 88, and/or the edge 86 may change to positively engage alternative configurations of the gripping formation 40 as described above.

In FIGS. 5 and 6, the locking tangs 64 have a pivoting end 90 which is opposite the contact end 76. The pivoting end 90 has a hole 92 where a pivoting pin 94 is attached to the locking tangs 64, which holds them inside the latch body 62 and allows the locking tangs to pivotally move between the open and closed positions. Also in this embodiment, the push button 72 is provided with a pair of holding pins 96 which each engage and abut the shoulders 84 of the locking tangs 64 to bias them into the closed position as seen in FIG. 5. These holding pins 96 also retain the push button 72 from escaping the housing 11 under the force of the springs 80. The holding pins 96 also act as a stop for the locking tangs 64. As seen in FIG. 6, the locking tangs 64 are only allowed to pivotally open until the pivoting end 94 abuts the holding pin 96. Both the pivoting pins 94 and the holding pins 96 are disposed generally parallel to each other, and are generally normal to the plane defined by the locking tangs 64.

In operation, the assembled fuel cell 14 and the adapter 16 are placed into the fuel cell chamber 12 of the tool 10. Once inside the fuel cell chamber 12, the nozzle 20 will come into contact with the latch 60, and the operator will then press the fuel cell 14 inward. The ramped configuration of the lugs 32 spread the locking tangs 64 apart. When the truncated lug ends 36 pass by the biased locking tangs 64, the locking tangs will close, and the inside edge 86 will engage the groove 40 or other configurations of the gripping formation of the adapter 16, so that the lug ends are positioned above the locking tangs and the truncated rib ends 38 are positioned below the locking tangs. In this position, the adapter 16 is securely held inside the tool 10 (best seen in FIG. 4).

The fuel cell chamber 12 is seen in FIG. 4, where the fuel cell 14 and adapter 16 are locked in the latch 60. As the adapter 16 becomes locked in the latch 60, a fuel metering valve stem 98 pierces the frangible membrane 28 and is inserted into the molded insert seal 44, so that the fuel metering valve stem is aligned with, and preferably abuts the fuel cell stem 50 in between the pair of internal sealing rings 54. This arrangement enables sealed fluid communication between the fuel cell 14 and the fuel metering valve 13.

While in use, the frangible membrane 28 has the advantage of protecting the fuel cell 14 from dirt and other debris. Since the latch 60 holds the adapter 16 and the fuel cell 14 in an engaged position with the fuel metering valve 13, the entire adapter system is very compact and there is no need for a cell chamber back door, or end cap, as is found on some models of combustion tools.

When a user needs to remove the fuel cell 14 from the tool 10, he simply pushes the push button 72 inward against the springs 80, so that as the boss 74 is moved inward pushing against the inclined surfaces 78 of the locking tangs 64, it progressively separates the locking tangs until the pivoting ends 90 abut the holding pins 96, and the locking tangs disengage from the groove 40. In this open position 68 (best seen in FIG. 6), the inside edges 86 of the locking tangs 64 form an opening large enough so that the lugs 32 of the adapter 16 are able to freely pass, and the fuel cell 14 can be removed from the fuel cell chamber 12. As the adapter 16 is pulled out of the fuel cell chamber 12 with the spent fuel cell 14, the fuel metering valve stem 98 is separated from the molded insert seal 44 and it leaves the frangible membrane 28 pierced, which visually shows that the fuel cell 14 has been used.

The design of the latch 60 is such that installation and removal of the fuel cell 14 is user friendly, and is comparable to installing and removing a battery of such combustion tools. Another advantage is that the adapter 16 cannot be removed from the It fuel cell 14 without fracturing the support ribs 34, and therefore cannot be reused on another fuel cell.

Thus, it will be seen that the present fuel cell adapter 16 and latch 60 provides an improved fuel cell adapter system that protects the fuel cell stem 50 during transportation, and also protects the fuel cell 14 from dirt and other debris while the tool 10 is in use. This improved fuel cell adapter system also keeps the whole system compact and makes installation and removal of the fuel cell 14 user friendly. Further, the present invention identifies if the fuel cell is unused or not, and also the adapter cannot be reused on a generic fuel cell.

While a particular embodiment of the fuel cell adapter system has been shown and described, it will be appreciated by those skilled in the art that changes and modifications may be made thereto without departing from the invention in its broader aspects and as set forth in the following claims.

What is claimed is:

1. A fuel cell adapter configured for connection to a fuel cell, comprising:

an adapter body having a nozzle and defining a passageway;

a base configured for engagement upon the fuel cell;

a frangible membrane blocking said passageway; and a plurality of circumferentially spaced support ribs configured for connecting said nozzle to said base.

2. The fuel cell adapter as defined in claim 1, wherein said frangible membrane has a hole for air escape and is disposed at said free end of said nozzle for indicating tampering when ruptured.

3. A fuel cell adapter configured for connection to a fuel cell, comprising:

an adapter body having a nozzle and a base configured for engagement upon the fuel cell, said nozzle connected to said base;

said adapter body having a gripping formation configured for engagement with a latch, wherein said adapter body houses a molded insert seal in said passageway; and wherein said molded insert seal defines an axial passageway and has a first end configured for receiving a stem, and a second end provided with a pair of internal sealing rings located in said axial passageway.

4. The fuel cell adapter as defined in claim 3, wherein said gripping formation is a groove.

5. The fuel cell adapter as defined in claim 4, further comprising:

said nozzle having a plurality of lugs and a plurality of support ribs;

said lugs each having a ramped configuration, extending from a free end of said nozzle toward said base, and having a truncated lug end; and said support ribs each having a truncated rib end, and configured for connecting said nozzle to said base.

6. The fuel cell adapter as defined in claim 5, wherein said lugs are radially spaced relative to each other, and said support ribs are radially spaced relative to each other.

7. The fuel cell adapter as defined in claim 6, wherein said lugs are axially skewed relative to said support ribs.

8. The fuel cell adapter as defined in claim 3, further comprising at least one barb formed on said base and configured for frictionally engaging the fuel cell.

9. A fuel cell adapter configured for connection to a fuel cell, comprising:

an adapter body having a generally cylindrical nozzle and a base configured for engagement upon the fuel cell, said nozzle connected to said base;

said nozzle having a free end defining a passageway;

a frangible membrane blocking said passageway; and wherein said frangible membrane has a hole for air escape and is disposed at said free end of said nozzle for indicating tampering when ruptured.

10. A fuel cell adapter configured for connection to a fuel cell, comprising:

an adapter body having a nozzle and a base configured for engagement upon the fuel cell, said nozzle connected to said base;

said adapter body having a gripping formation configured for engagement with a latch;

said nozzle having a plurality of lugs and a plurality of support ribs;

said lugs each having a ramped configuration, extending from said free end toward said base, and having a truncated lug end; and said support ribs each having a truncated rib end, and configured for connecting said nozzle to said base.

11. The fuel cell adapter of claim 1, wherein said plurality of support ribs are L-shaped.

12. The fuel cell adapter of claim 11, wherein said nozzle has a free end, and a plurality of lugs extend in an inclined configuration from said free end toward said base.

13. The fuel cell adapter of claim 1, wherein at least one of said circumferentially spaced support ribs has a truncated end defining a groove in said nozzle.

14. The fuel cell adapter of claim 1, wherein said nozzle has a free end, said frangible membrane is disposed at said free end and a groove is formed in said nozzle closer to said free end than said base.

* * * * *